Dec. 30, 1924.  1,521,563

C. PFLEEGOR

FLUID LENS

Original Filed Nov. 16, 1921

Carroll P. Pfleegor INVENTOR.

Patented Dec. 30, 1924.

1,521,563

UNITED STATES PATENT OFFICE.

CARROLL PFLEEGOR, OF MILTON, PENNSYLVANIA, ASSIGNOR TO THE SCIENTIFIC APPARATUS CORPORATION, OF MILTON, PENNSYLVANIA, A CORPORATION OF PENNSYLVANIA.

FLUID LENS.

Application filed November 16, 1921, Serial No. 515,586. Renewed November 25, 1924.

*To all whom it may concern:*

Be it known that I, CARROLL PFLEEGOR, a citizen of the United States, residing at Milton, in the county of Northumberland and State of Pennsylvania, have invented certain new and useful Improvements in Fluid Lenses, of which the following is a specification.

This invention relates to new and useful improvements in fluid lenses and more particularly to a novel and improved, highly efficient and accurate fluid lens which may be constructed as a substitute for the ground glass lenses at a minimum of cost.

Another and equally important object of my invention is the provision of a double convex or a double concave fluid lens of substantially small diameter and one wherein the focal lengths may be varied as desired during the assembling of the lens.

A further and continued object of my invention is first, to provide a means for forming either convex or concave lenses from any transparent fluid by confining the same in a specially constructed holder, whereby the focal length of the lens may be adjusted to various lengths desired when the lens is in the course of construction; secondly, to produce lenses that may be quickly adjusted to various focal lengths by varying the amount of fluid in the body of the lenses; third, methods of constructing lenses having fluids, each of a different index of refraction so as to form an achromatic combination; and fourth, the method of reinforcing the body of the fluid in the lenses whereby to increase its ruggedness.

With the above and other objects in view the invention consists in the novel features of construction and arrangement of parts hereinafter fully set forth and pointed out in the subject matter being claimed and shown in the accompanying drawing wherein, Figure 1 is a vertical section of the simplest form of a double convex or of an alternative double concave fluid lens, shown in dotted lines, constructed in accordance with my invention.

Figure 1:
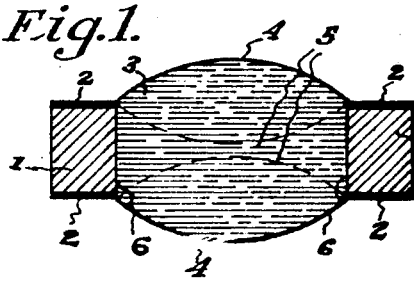

Referring now to the drawings wherein like reference characters designate corresponding parts throughout the several views, and particularly to Figure 1, numeral 1 designates a ring for holding a transparent fluid which is to serve as the lens, the outside diameter of said lens being equal to the inside diameter of the ring 1. I have found that by placing a drop of any transparent fluid such as glycerine designated by numeral 3 of the drawing, on the inner wall 6 of the ring, by reason of its adhesion, the fluid will be retained by the ring, it being of course understood that the diameter of the same is substantially small, the drawings showing the construction of an enlarged and exaggerated scale. As the fluid 3 is added drop by drop it has the tendency to bulge out on both sides of the wall 6 of the ring 1, thus forming two spherical surfaces as at 4—4. As is well known, a drop of any transparent fluid such as glycerine, when free, will form a substantially perfect sphere. In the case of a lens such as shown by Figure 1, the fluid 3 in the ring 1 is prevented from forming a perfect sphere as the adhesion of the same against the wall 6 of the ring 1 is greater than the surface tension of the fluid so that it will adhere against the wall and be of the same form. However, all the fluid on the outside of the wall 6 will form perfect spherical surfaces such as shown at 4, so that a perfect, double convex lens is formed in this instance. However in the case of small diameter lenses, the distortion is so slight that it is hardly noticeable. When the fluid 3 is taken out of the ring 1, so that it will only partially fill it or to the limit shown by the dotted lines 5—5, the fluid 3 will tend to form spherical surfaces but they will be negative to those previously formed as at 4—4, so that in this case a perfect double concave lens is formed.

The surfaces formed at 4—4, or 5—5 are perfectly smooth, in fact, as much if not more so than those obtained on ground and polished glass lenses. Furthermore the surfaces above indicated thus formed will never fog or cloud over due to moisture condensing on them, which would not be the case if moisture were allowed to condense on the surface of an ordinary glass lens.

The fluid 3 thus held by the wall 6 of the ring 1 is at a considerable surface tension on its spherical surfaces 4—4 or 5—5 and is quite resistant to any shocks and vibrations incident thereto and at a greater degree than would ordinarily be supposed. Furthermore this can also be increased by selecting a fluid 3 that has a high degree of viscosity.

The fluid 3 in the lens will after a considerable length of time have the tendency to ooze over and flow over the edges of the wall 6 of the ring 1. In order to prevent this taking place I have applied a thin coating of wax 2—2 on the upper and lower surface of the ring. As most ordinary fluids will not combine or adhere to wax, it will be seen that the edge of ring 1 is made impervious to the fluid 3 that is placed in the ring or even if the fluid is forcibly extended over the edge of the wall 6, it will not remain there but instead will be drawn back in its initial position since it cannot find sufficient adherence on the wax surface 2—2 and also because the surface tension of the fluid on its spherical surfaces 4—4 or 5—5, tends to oppose any change in its shape.

Figure 2:
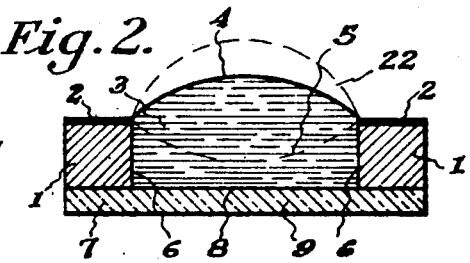
Figure 2 is a vertical section of a simple form of a plano-convex or an alternative plano-concave fluid lens, shown in dotted lines, constructed in accordance with my invention.

In Figure 2, the construction of either a plano-convex or a plano-concave fluid lens is shown wherein a glass disc 7 of the same diameter of the ring 1 is cemented or otherwise secured together so that only one side of the ring 1 is open. The inner surface 8 of the glass disc 7 is on the inside of the ring 1 and the face 9 is on the opposite surface of the glass disc 7 facing outwardly, forming one surface of the lens. A thin coating of wax 2 is also placed on the upper edge only of the ring 1 similarly as shown in Figure 1 and for the same purpose. When the ring 1 is filled with the fluid 3 so that it forms a spherical surface 4, a plano-convex lens will be made or by adding more fluid so as to bring up the surface 4 to the limit of the dotted line 22, the curvature of the latter being greater than the spherical surface 4 above indicated, the focal length of the lens will be reduced. When the fluid 3 does not entirely fill the ring 1, a plano-concave lens will be, of course formed. By thus varying the amount of fluid, it will be seen that the lens may be quickly adjusted in any focal length within reasonable limits depending upon the diameter of the ring 1. This cannot be done with glass lenses as for every change made it is necessary to go through a tedious grinding and polishing process and of course the focal length cannot be varied at will as in the case with the fluid lens above described. There is considerable adhesion of the fluid 3 against the surface 8 in addition to that of the inner wall 6. The atmospheric pressure on the spherical surface of the lens also tends to keep the fluid 3 in place so that it will be seen that lenses formed with one plane surface 9 and the other a spherical convex surface 4, or a spherical concave surface 5 are far more rugged than those with two spherical surfaces as indicated by Figure 1 of the drawing.

Figure 3:
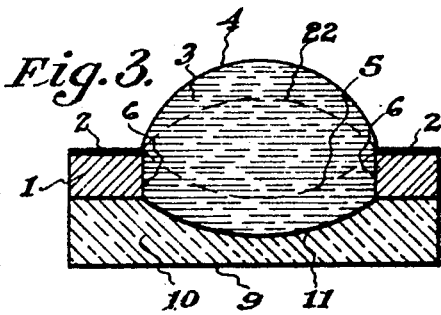
Figure 3 is a vertical section of an achromatic combination composed of a double convex fluid lens and a concave glass lens.

The lens shown by Figure 3 is substantially identical with that shown by Figure 2 with the exception that the plain glass disc 7 is replaced by a glass disc 10, considerably thicker and which disc is provided with a concave depression indicated by numeral 11 ground in it of the same diameter as the wall 6 of the ring 1. The glass disc 10, in practice, should be made of glass having a higher dispersing power than that of the fluid 3 forming the rest of the lens. It will be seen that an achromatic lens combination may readily be formed as the surfaces 9 and 11 of the glass disc 10 form a plano-concave lens, while the fluid 3 forms a double convex lens, one convex spherical surface being indicated at 4 while the other is formed at 11 where the fluid is in direct contact with the concave depression in the glass disc 10 resulting in another spherical surface as above indicated. This lens may be corrected purposely achromatic simply by varying the amount of fluid 3 in the ring 1 so as to form a spherical surface above or below the dotted line 22. By placing enough fluid 3 in the ring 1 so as to form a concave spherical surface indicated by numeral 5 in this figure, an achromatic, plano-concave lens is formed that may also be varied for correcting so as to be made perfect.

Figure 4:
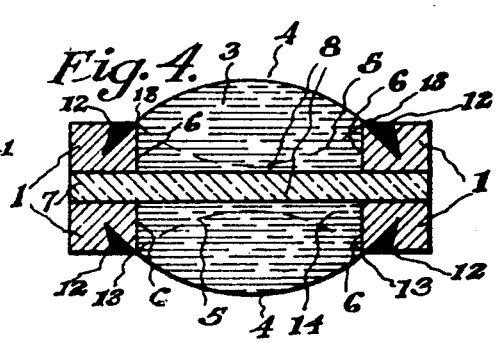
Figure 4 is a vertical section of a combination of either two plano-convex fluid lenses or of an alternative combination of two plano-concave fluid lenses shown in dotted lines, or an achromatic combination of a plano-convex and a plano-concave fluid lens.

In the modified form illustrated by Figure 4 of the drawing, the modified lens combination also comprises a glass disc 7 interposed between two similarly shaped rings 1—1, cemented or otherwise fastened on either side of said disc. In addition I also have shown an improvement in the method of securing the wax around the edge of the ring 1 in order to prevent the fluid 3 from flowing over the upper or lower surface of the ring. In this instance a wedge shaped depression 12 is cut around the top and bottom 1—1, so that a knife-like edge is formed as shown, the said depression 12 being somewhat in the form of an obtuse triangle which, when filled with the wax forms a ring adjacent the inner corner of the ring contiguous to the wall 6. As will be seen the wax ring 13—13, is securely held from becoming loose and presents a knife-like edge where the same touches the fluid. In this instance the edge of the fluid 3 will be more sharply defined resulting in a lens more perfect than when the wax 2 is applied as in the previous lens construction shown. The rings 1—1 on both sides of the glass disc 7 are now filled with the fluid 3. It will be thus recognized that it is possible to make lenses of several combinations with this type of holder or ring 1—1, so that when the same is filled, the fluid 3 extends to the limits 4—4, the said spherical surfaces formed resulting in the formation of a double convex lens. It really consists of two plano-convex lenses back to back. The glass disc 7, whose surfaces 8—8 are plane, transmit light and also serve as a surface for the fluid 3 to adhere to on either side resulting in a fluid lens of increased ruggedness as described in connection with Figure 2 of the drawing.

When the rings 1—1, are only partially filled with the fluid 3 so as to form the spherical surfaces 5—5, a double concave lens combination is formed. By filling one of the rings 1 to the spherical surface 4 and the other ring 1 to the spherical surface 5 with a fluid 14 having a higher dispersing power than the fluid 3, an achromatic lens combination is formed which may be easily adjusted so as to be perfectly achromatic by varying the amount of the fluid 3, 14 in the ring holders. By thus varying the amount of the fluids in both rings, the focal length of the lens will be either increased or decreased as is readily recognized. In either case, however, it may be set perfectly achromatic simply by varying one or the other slightly.

While I have found metal an ideal material to form the ring 1, I do not wish to be confined or restricted to this as it is obvious that any other non-porous material can be utilized.

In my lens the best results have been obtained when the same are held horizontally or nearly so, such as is usually the practice when they are positioned in microscopes. However, this only applies to convex fluid lenses over $\frac{1}{16}$ of an inch in diameter and to concave fluid lenses over $\frac{3}{32}$ of an inch in diameter. Fluid lenses smaller in diameter than these are practically unaffected by gravity as the adhesion of the fluid against the retaining surfaces is so great that they may be used in any position.

While I have found glycerine to be an ideal material to form the body of lenses, I do not wish to be confined, limited or restricted to this fluid as it is obvious that any other clear, transparent fluid may be utilized with equally good results. In addition, two or more fluids of different dispersing power may be combined to obtain a fluid that will have a different power of dispersion than a simple fluid. It is also possible to change the dispersing powers of fluids used for lenses by dissolving chemicals therein that are capable of being held in solution. Of course my invention is intended for making small lenses having the diameter of not more than $\frac{3}{8}$ of an inch. It is intended principally for constructing lenses for any purpose requiring extreme accuracy with a very short focal length but as is used in microscope objectives or eyepieces, but it will be readily recognized that the same can be utilized in other connections.

Having shown and described my invention what I now claim as new and desire to secure by Letters Patent in the United States is:—

1. A lens consisting of a holder, a transparent disk attached to the holder, a fluid adhering to the holder and to the disk, said lens being spherical in contour and of a focal length depending on the amount of fluid retained by the holder, and means resisting the flow of the fluid on the holder.

2. A lens consisting of an annular holder, a disk attached to the holder, a fluid adhering to the inner wall of the holder, a flux resisting compound on the holder, said lens being spherical in contour and of a focal length depending on the amount of fluid retained by the holder.

3. A lens consisting of a disk, a pair of holders attached to the disk on opposite sides thereof, a fluid adhering to the holders and the faces of the disk, said lens being spherical in contour and of a focal length depending on the amount of fluid retained by the holders and means for resisting the flow of the fluid when the amount of fluid is increased above the plane or level of the holders.

4. A lens consisting of a disk, a pair of holders attached to the disk on opposite sides thereof, a transparent fluid adhering to the holders and the faces of the disk, said lens being spherical in contour and of a focal length depending on the amount of fluid retained by the holders, and a countersunk flux resisting substance on the outer surfaces of the holders preventing the flow of the fluid when the amount thereof is increased above the plane or level of the holders.

Witnessed this 18th day of October, 1921.

CARROLL PFLEEGOR.

Witnesses:
 THEODORE J. TILLBAUN,
 DAN. PATTERSON.